US011258812B2

(12) United States Patent
Gupta (10) Patent No.: US 11,258,812 B2
(45) Date of Patent: Feb. 22, 2022

(54) AUTOMATIC CHARACTERIZATION OF MALICIOUS DATA FLOWS

(71) Applicant: Avast Software s.r.o., Prague (CZ)

(72) Inventor: Rajarshi Gupta, Los Altos, CA (US)

(73) Assignee: Avast Software s.r.o., Prague (CZ)

( * ) Notice: Subject to any disclaimer, the term of this patent is extended or adjusted under 35 U.S.C. 154(b) by 168 days.

(21) Appl. No.: 16/450,368

(22) Filed: Jun. 24, 2019

(65) Prior Publication Data

US 2019/0394220 A1    Dec. 26, 2019

Related U.S. Application Data

(60) Provisional application No. 62/689,697, filed on Jun. 25, 2018.

(51) Int. Cl.
*H04L 29/06* (2006.01)
*G06F 21/55* (2013.01)
*G06K 9/62* (2022.01)

(52) U.S. Cl.
CPC ........ *H04L 63/1425* (2013.01); *G06K 9/6267* (2013.01); *H04L 63/02* (2013.01); *H04L 63/1416* (2013.01); *H04L 63/1491* (2013.01); *G06F 21/55* (2013.01)

(58) Field of Classification Search
CPC . H04L 63/1425; H04L 63/02; H04L 63/1416; H04L 63/1491; H04L 29/06; G06K 9/6267; G06F 21/55
See application file for complete search history.

(56) References Cited

U.S. PATENT DOCUMENTS

| 9,911,043 | B2 * | 3/2018 | Saitwal | G06K 9/6221 |
| 2009/0300765 | A1 * | 12/2009 | Moskovitch | G06K 9/6256 726/24 |
| 2010/0064368 | A1 * | 3/2010 | Stolfo | H04L 63/1416 726/24 |
| 2010/0115621 | A1 * | 5/2010 | Staniford | G06F 21/561 726/25 |

(Continued)

OTHER PUBLICATIONS

Trigram, http://web.archive.org/web/20180314070605/en.wikipedia.org/wiki/Trigram, 4 pages. Accessed Sep. 19, 2019.

(Continued)

*Primary Examiner* — Jayesh M Jhaveri
(74) *Attorney, Agent, or Firm* — Avek IP, LLC; William B. Kircher (57) ABSTRACT

A method of identifying malicious activity in a sequence of computer instructions includes monitoring data flows from a public network to one or more networked devices on a private network and to one or more honeypots that appear to the public network to be devices on the private network, representing each such data flow as a word, and the sequence of data flows as comprising an n-gram of two or more words. The data flows are characterized with a likelihood of being malicious based on their statistical association with the one or more honeypots relative to their statistical association with one or more networked devices. Identified malicious activity is used to train a network device to identify malicious data flows and prevent them from reaching devices on the private network.

15 Claims, 6 Drawing Sheets

(56) References Cited

U.S. PATENT DOCUMENTS

| | | | | |
|---|---|---|---|---|
| 2012/0036577 A1* | 2/2012 | Bolzoni | ............. | H04L 63/1408 |
| | | | | 726/23 |
| 2019/0018904 A1* | 1/2019 | Russell | ............... | G06F 16/9024 |
| 2020/0067861 A1* | 2/2020 | Leddy | ..................... | H04L 51/12 |

OTHER PUBLICATIONS

Bigram, http://web.archive.org/web/20180502162424/https7/en.wikipedia.org/wiki/Bigram, 6 pages. Accessed Sep. 19, 2019.

* cited by examiner

AUTOMATIC CHARACTERIZATION OF MALICIOUS DATA FLOWS

CROSS-REFERENCE TO RELATED APPLICATIONS

This Application claims priority to U.S. Provisional Patent Application Ser. No. 62/689,697, filed on Jun. 25, 2018, entitled "AUTOMATIC CHARACTERIZATION OF MALICIOUS DATA FLOWS,", the entire disclosure of which is incorporated herein by reference.

FIELD

The invention relates generally to security in computerized systems, and more specifically to automatic characterization of data flows as malicious or not malicious.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities.

For example, a firewall in a home or office may restrict the types of connection and the data that can be transferred between the internal network and an external network such as the Internet, based on firewall rules and characteristics of known malicious data. The firewall is typically a computerized network device that inspects network traffic that passes through it, permitting passage of desirable network traffic while blocking undesired network traffic based on a set of rules. Other systems for intrusion detection and prevention include honeypots, which are decoy computer systems designed to attract the attention of an attacker or intruder, and to gather information regarding attempts at unwanted computer access. Honeypots do not therefore replace traditional security services such as a firewall or other security appliance, but are an additional tool that can be useful in determining when and how an attacker has breached a network's security.

But, new threats are constantly emerging, making efficient and timely detection of malicious data and other security breaches a significant challenge. It is therefore desirable to manage analysis of data passing across a network to provide efficient detection of vulnerabilities.

SUMMARY

One example embodiment of the invention comprises identifying malicious activity in a sequence of computer instructions, including monitoring data flows from a public network to one or more networked devices on a private network and to one or more honeypots that appear to the public network to be devices on the private network, where each such data flow comprises two or more words. The data flows are characterized with a likelihood of being malicious based on their statistical association with the one or more honeypots relative to their statistical association with one or more networked devices.

In another example, malicious activity is identified in a sequence of computer network data by monitoring data flows from a public network to one or more networked devices on a private network, each such data flow represented as a word, and the sequence of flows from a device as an n-gram of two or more words. Each n-gram is evaluated for statistical position within each of a first and second data set ordered by frequency of n-gram occurrence within a data type represented by the respective data set, and each n-gram is characterized with a probability of being of a data type represented by either the first or second data set based on its statistical position within at least one of the first and second data sets.

In a further example, the first and second data sets respectively comprise known malicious and known benign data types.

The details of one or more examples of the invention are set forth in the accompanying drawings and the description below. Other features and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common documents are all frequently infected with malware of various types, and users rely on tools such as antivirus software or other malware protection tools to protect their computerized devices from harm.

Further, an increasing number of devices such as home appliances, vehicles, and other devices (known collectively as the Internet of Things, or IoT) are connected to public networks and are susceptible to unauthorized interception or modification of data. For example, many popular security cameras are known to have vulnerabilities enabling attackers to access the device without authorization, enabling the attackers to view and record image data from the cameras or control camera operation. Similar vulnerabilities are known to exist or may exist in other IoT devices, including network-connected home security systems such as electronic locks, home appliances such as smart thermostats or kitchen appliances, and vehicles with network access. The Internet of Things, and associated potential security risks, extend to a wide variety of other environments and applications including commercial applications such as manufacturing monitoring and control systems, medical and health care devices used to diagnose or treat medical conditions, and infrastructure monitoring and control such as bridges, railways, wind farms, and the like.

In a typical home computer or corporate environment, firewalls inspect and restrict the types of communication that can occur between local devices such as computers or IoT devices and the Internet, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes. But, with new threats constantly emerging, efficient and timely detection of vulnerabilities within computerized systems and IoT devices such as a home appliance remain a significant challenge.

Some examples described herein therefore seek to improve the performance of malware safeguards such as firewalls or antivirus software by characterizing data streams destined for honeypot or decoy devices as malicious while characterizing data streams characteristic of legitimate devices as not malicious. In a further example, incoming data streams are compared against data streams such as n-grams representing data known or believed to be malicious and n-grams representing data known or believed to be benign, and the relative correlation between the incoming n-grams and n-grams from the known data sets is used to predict or classify whether the incoming n-grams are malicious.

In another example, n-grams from incoming data streams that are more strongly correlated with n-grams characteristic of a honeypot or decoy device than with n-grams characteristic of actual devices (such as devices of the same type as the honeypot device) are characterized as probably malicious, and in a further example are added to a list of n-grams believed to be likely malicious. Similarly, n-grams more strongly correlated with n-grams characteristic of actual devices than honeypot devices are characterized as probably benign.

Figure 1:
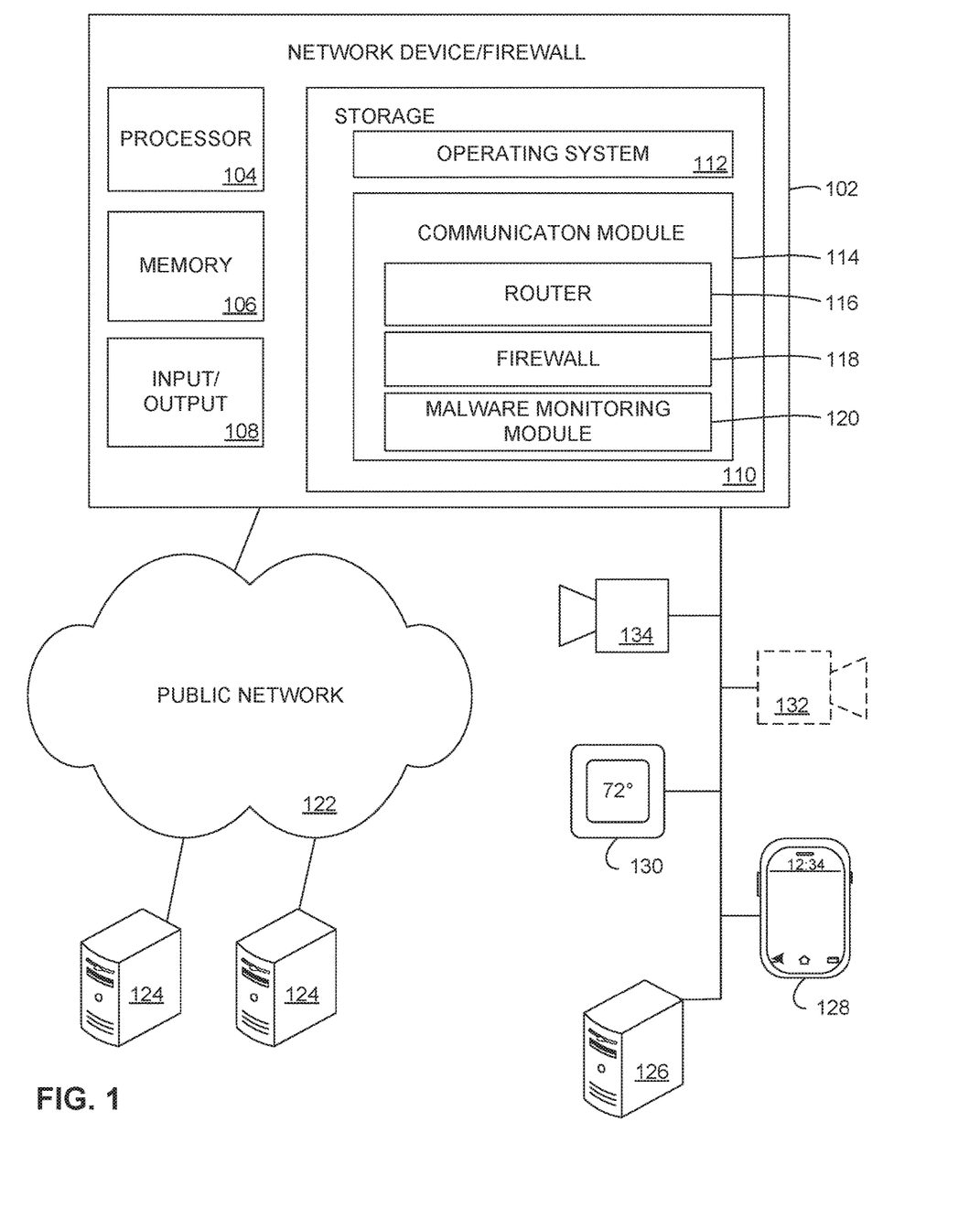
FIG. 1 shows a firewall network appliance operable to monitor and characterize incoming data streams as malicious, consistent with an example embodiment.

FIG. 1 shows a network appliance operable to monitor and characterize incoming data streams as malicious, consistent with an example embodiment. Here, a network device such as a firewall 102 comprises a processor 104, memory 106, input/output elements 108, and storage 110. Storage 110 includes an operating system 112, and a communication module 114 that is operable perform various firewall, routing, and malware classification functions. The communication module 114 further comprises router module 116 operable to route data being exchanged between devices on a public network 122, such as public network devices 124, and devices on a private (e.g., internal) network, such as devices 126-134. Similarly, firewall 118 is operable to prevent the flow of unwanted data such as known malware or unwanted types of data connections between the public network 122 and private network devices 126-134. The malware monitoring module 120 in this example is operable to perform malware detection functions in addition to those traditionally performed by a firewall, including detecting and classifying data flows determined to be more characteristic of malware than benign data as malware.

The malware monitoring module 120 performs such functions in one example by comparing incoming data flows, characterized as n-grams such as bi-grams or tri-grams of data, with a data set of n-grams known or believed to be or labeled/classified as malicious and a data set of n-grams known or believed to be or labeled/classified as benign. Although a particular n-gram may occur in both data sets, the data sets further include the frequency of occurrence of the n-gram in benign data and in malicious data, such that the malware monitoring module 120 can use the relative likelihood of occurrence of the n-gram in malicious data and in benign data to classify the n-gram as likely malicious or likely benign. In a further example, a data set of n-grams characteristic of public network communication with a decoy device known as a honeypot are either added to the set of n-gram data believed to be malicious or to an independent set of n-grams, such that received n-grams more characteristic of communication with the honeypot than with actual private network devices are characterized as likely malicious. In a more detailed example, each data flow is described by one or more NetFlow records, where the data flow is identified by the 5-tuple of {source IP address, destination IP address, source port, destination port, protocol}. This 5-tuple description of a data flow would be represented as a "word" and the sequence of data flows for a device would be a string of words. Then, the n-gram is a consecutive set of n data flows to/from this device.

In operation, the malware monitoring module 120 is installed in a network, such as within a network device such as a firewall, as shown at 102 or elsewhere within the data flow between a public network 122 and one or more private network devices 126-134. When public network devices 124 (e.g., computer systems, etc.) on the public network 122 attempt to communicate with the private network devices 126-134, the malware monitoring module 120 monitors the data flows between the public and private network devices, and characterizes the data flows as likely benign or likely malicious. The private network devices 126-134 include in this example a computer 126, a smartphone 128, a smart thermostat 130, a honeypot or decoy video camera 132, and an actual video camera 134. Devices such as smart thermostat 130 and video camera 134 are often referred to as being a part of the Internet of Things, or IoT devices, which in other examples includes a wide variety of devices that can be connected to the Internet such as vehicles, industrial controls, home appliances, and home automation or control systems.

The honeypot video camera 132 is in this example not configured to be used as an actual video camera such as for surveillance or security monitoring, but is present on the network as a decoy for intruders. The honeypot video camera 132 may therefore not include all the hardware typically associated with a video camera, but may be emulated on a computerized device or within the network device/firewall 102. The honeypot video camera 132 in some examples will be left relatively unprotected by the firewall 118, so that unauthorized attempts by a public network device 124 to access the honeypot video camera 132 can be captured and analyzed by the malware monitoring module 120. The honeypot video camera 132 is configured to appear to public network devices 124 as a real device, and in some examples will include firmware, operating system, or in a further example an actual video camera device to ensure that the honeypot device responds as expected to interaction from public network devices 124.

The honeypot (e.g., honeypot video camera 132, etc.) in a more detailed example is implemented by adding virtual endpoints such as Internet Protocol (IP) addresses to the private network, that respond to standard network discovery attempts such as Address Resolution Protocol (ARP) requests, ICMP pings, HTTP or other service requests to IoT devices, and other such network requests often used to find and communicate with systems on a network. The honeypot video camera 132 therefore appears to other systems, such as public network devices 124, and in a further example local computer 126, to be a part of the private network. Traffic from systems such as these destined to honeypot IP addresses is directed to the network device 102 or to another device hosting the honeypot, such that the honeypot appears to be an actual functioning device on the private network.

The honeypot in other examples may be located on the internal or private network side of the network device 102, or may be located on the external or public side of the network device 102, such as is often the case with Internet servers and other such systems. In examples where the honeypot is located inside the network, such as is shown at 132 in FIG. 1, the honeypot may also monitor for internal threats, such as virus or Trojan attacks from another computer on the private network such as computer 126. As the honeypot system should receive very little traffic on an internal network as it provides no real services to typical users, a pattern of unusual traffic from an infected computer 126 to an internal honeypot 132 may further provide an indication of a security threat that is not identified by other means such as antivirus software, enabling the network administrator to more quickly find and respond to the threat.

The network device 102 in this example is therefore operable to make it appear to other networked computer systems that the honeypot video camera 132 is an actual video camera that is connected to the private network, making it an attractive target for attackers. Although the honeypot is shown in FIG. 1 at 132 to be a single video camera, in other examples it may be another networked device or server, a network segment or subnet, or an elaborate virtual network environment configured to attract the attention of attackers. The honeypot in various such examples includes mail servers, database servers, or other systems that provide information or services that may be attractive to an attacker. Although some honeypots may include minimal resources, such as only those most likely to be accessed by an attacker, others will appear to be fully operational systems, using standard operating systems and other software, making them more difficult for an attacker to recognize as a potential honeypot.

Malware monitoring module 120 is operable to monitor and distinguish between data flows between the public network 122 and actual private network devices, such as smartphone 128 or video camera 134, and data flows between the public network 122 and honeypot devices such as honeypot video camera 132. Because data flows to honeypot devices can reasonably be presumed to be more malicious than data flows to non-honeypot devices (e.g., computer 126, smartphone 128, etc.), as the honeypot devices exist to attract the attention and interaction of malicious public network users and devices, network flows to the honeypot devices can be stored as n-grams in a data set that is labeled/classified as comprising n-grams that are substantially more malicious in nature than n-grams of data flows to non-honeypot devices. Similarly, n-grams of network data flows characteristic of public network interaction with a legitimate private network device, such as computer 126 or smartphone 128, are stored as n-grams in a data set that is labeled/classified as comprising n-grams that are substantially benign (e.g., compared to n-grams of data flows to honeypot devices). By comparing the frequency or percentile rank (or their statistical metrics) with which a given n-gram appears in the honeypot n-gram data set with the frequency or percentile rank with which the same n-gram appears in the benign n-gram data set, the systems and techniques described herein make a correlation as to the maliciousness of an n-gram that is part of a network data flow.

This enables detection and characterization of network flows as malicious, even where the network data flow comprises a new or unknown attack not recognized by traditional firewall 118 or by other traditional methods such as antivirus software. In a further example, n-grams determined to likely be malware can be sent to a security research firm or other user or organization for review, to analyze the n-gram and associated data flows for malicious intent to help discover and protect against new threats.

Figure 2:
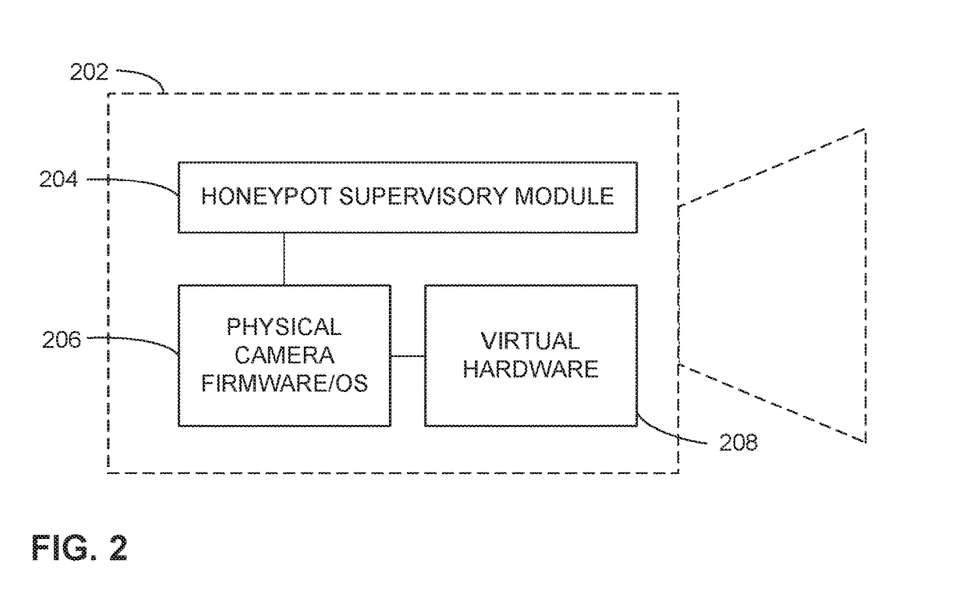
FIG. 2 is a more detailed example of a honeypot video camera, consistent with an example embodiment.

FIG. 2 is a more detailed example of a honeypot video camera, consistent with an example embodiment. Here, the honeypot virtual camera 132 comprises a honeypot supervisory module 204, which is operable to exchange data with the network and to perform various other functions such as recording, analyzing, and categorizing various interactions with other networked devices. In this example embodiment, no physical video camera exists, but the firmware and operating system of a real video camera as shown at 206 are executed under the control of honeypot supervisory module 204. The firmware is altered somewhat so that physical video camera hardware need not be present, such as by interacting with a virtual hardware module 208 configured to emulate hardware functions such as showing an image, simulating panning and tilting, and the like. Although the example embodiment of FIG. 2 shows a honeypot video camera device in which a physical video camera need not be present, some example embodiments of the systems and techniques described herein use a honeypot supervisory module or module providing similar functionality between the public network 122 and an actual device serving as a honeypot device. In further example embodiments, the systems and techniques described herein include a honeypot supervisory module or module providing similar functionality within an actual functioning device such as a honeypot network server operating as a virtual machine on actual network server hardware.

Figure 3:
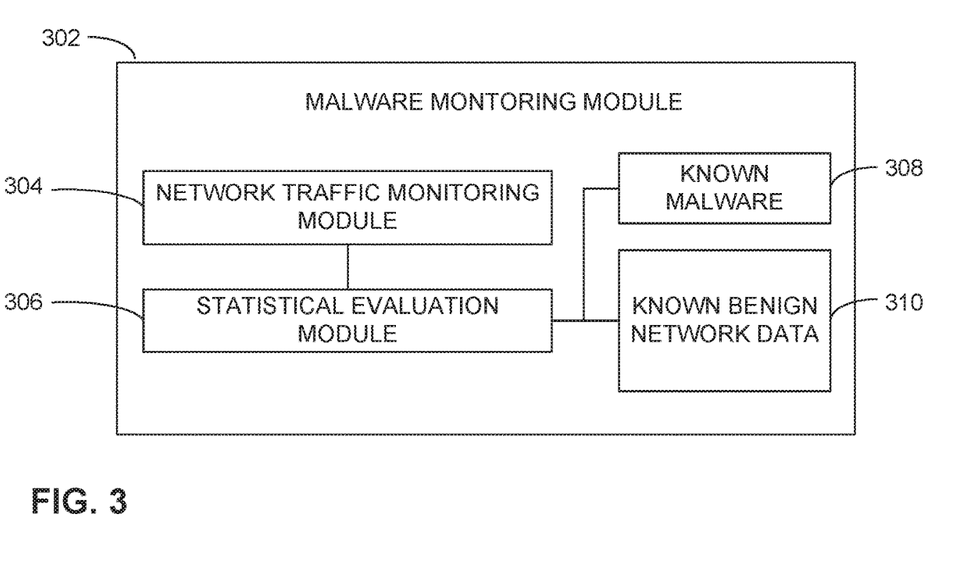
FIG. 3 is a more detailed malware monitoring module, consistent with an example embodiment.

FIG. 3 is a more detailed anomaly detection module, consistent with an example embodiment. Here, malware monitoring module 302, which in this example resides between a public network and a private network, is operable to monitor data flows between the public network and private network devices including in a further example one or more honeypot devices. The malware monitoring module 302 comprises a network traffic monitoring module 304, operable to monitor network traffic flows between devices on the public network and devices on the private network, and in a further example to characterize the network flows as n-grams such as bi-grams or tri-grams of data words exchanged between networked devices. A statistical evaluation module 306 is operable to evaluate the likelihood that a given n-gram is malicious or benign, such as by using data sets of known malware n-grams 308 and known benign network data n-gram data set 310. In a further example, a data set of n-grams of recorded public network interaction with one or more honeypot systems is also recorded, or comprises part or all of the known malware n-gram data set 308.

In operation, the network traffic monitoring module 304 records data flows and represents it as n-grams of data words exchanged between public network computers 124 and private network devices such as between public network computer 126 and private network devices 126-134 (including both real private network devices such as computer 126 and video camera 134, and honeypot devices such as honeypot video camera 132). The network traffic monitoring module 304 differentiates between and separately records n-grams of legitimate network traffic involving actual network devices, and presumed malicious traffic involving the one or more honeypot devices. The presumed malicious and benign n-grams are stored in separate data sets such as known malware n-gram data set 308 and known benign network data n-gram data set 310, which can later be used to estimate a likelihood that an n-gram of unknown intent is benign or malicious.

In a more detailed example, an incoming n-gram that may or may not be malicious is forwarded to statistical evaluation module 306, where it is searched in at least known malware n-gram data set 308 and known benign network data n-gram data set 310. If the n-gram is only found in one data set or the other, it is easy to estimate whether the n-gram is malicious or benign based on the data set in which the n-gram appears. In a more typical case, the n-gram will appear in both data sets, and a statistical estimation of the likelihood of the n-gram's appearance in malware data streams and in benign data streams is estimated, such as by the percentile location of the n-gram in the known malware data set 308 and known benign data set 310, to estimate whether the n-gram is malicious or benign. If the n-gram representation is not found in either dataset, a metric of "distance" (e.g. L1, L2 or L-infinity norm, or other statistical metrics like Hamming or Levenshtein distance) is used to identify which distribution (e.g., the distribution of known malware data set 308 or known benign data set 310) is closer to the sample (e.g., the n-gram representation).

The known malware data set 308 in some examples includes n-grams detected in network flows to the one or more honeypot devices, or is augmented by a separate data set of suspected malicious honeypot n-grams. Such separate suspected malicious honeypot n-grams can be used similarly to known malware n-gram data set 308, in that an n-gram more characteristic or more likely to occur in network data flows to a honeypot device than in normal legitimate network traffic can be estimated as likely malicious.

Figure 4:
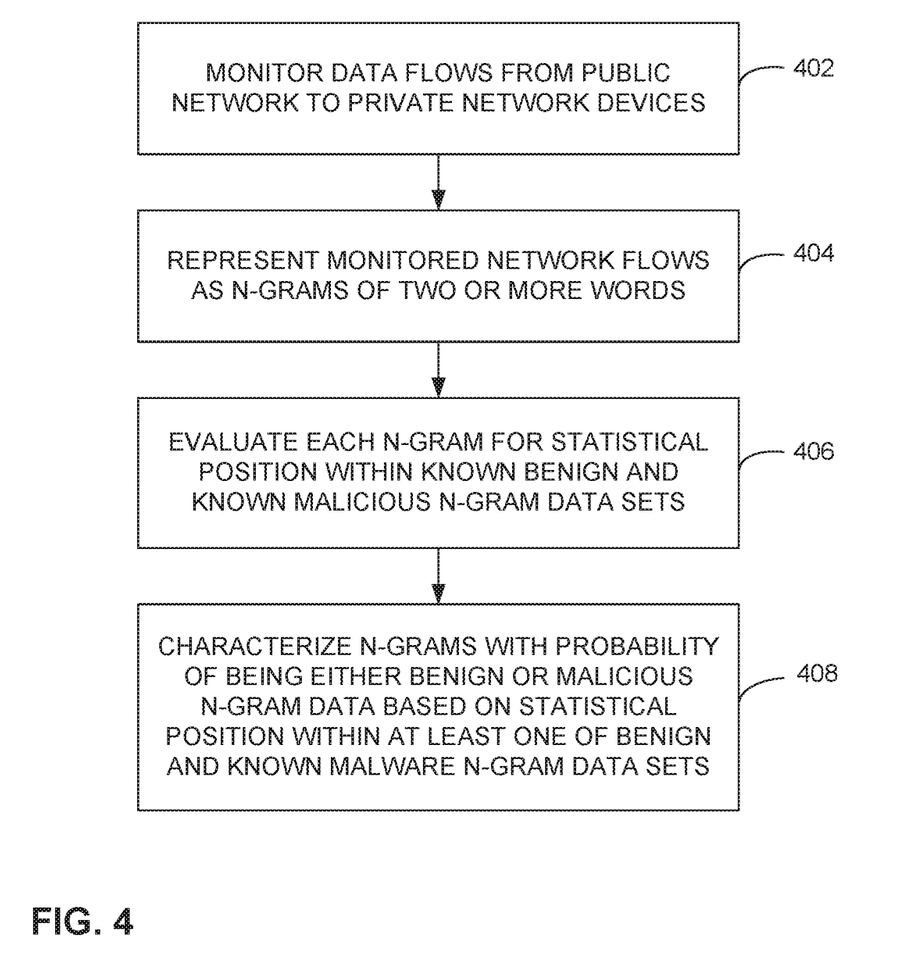
FIG. 4 is a flowchart of a method of characterizing network flows with a probability of being malicious, consistent with an example embodiment.

FIG. 4 is a flowchart of a method of characterizing network flows with a probability of being malicious, consistent with an example embodiment. At 402, data flows between a public network (e.g., public network 122) and a private network device (e.g., devices 126-134) are monitored, such as by the malware monitoring module 302 of FIG. 3. The network flows are represented as n-grams of two or more words at 404, such as bi-grams or tri-grams of instruction words or data words interchanged between the network devices. At 406, each n-gram is evaluated for its statistical position within a known benign data set (e.g., known benign data set 310) and a known malicious n-gram data set (e.g., known malware data set 308), such as percentile rank of occurrence of the n-gram within an ordered list of n-grams in the set or by the percentage of time the n-gram occurs within the total number of n-grams recorded in each set. The n-gram being evaluated is then characterized at 408 with a likelihood of being malicious or benign based on the statistical position within at least one of the known benign and known malware n-gram data sets. In one such example, an n-gram determined to occur more frequently in the known malware n-gram set than in the known benign n-gram set is determined to be characteristic of a malicious data flow, while in other examples other statistical measures are used such as requiring an n-gram be 20%, 30%, 50%, or some other percentage more likely to occur in the known malicious n-gram set than the known benign n-gram set to provide a margin of safety to reduce false malicious data flow detections.

In a further example, a separate n-gram data set of n-grams representing communication between public network devices and one or more honeypots is used similarly to the known malicious n-gram data set, or is used to augment or is integrated within the known malicious n-gram data set. In some further example embodiments, one or more actions are performed (e.g., by network device 102, firewall 118, etc.) on the data flows characterized as being malicious to protect computer systems (e.g., computer 126, smartphone 128, etc. on a private network) from the malicious data flows, such as discarding malicious packets or dropping a connection to the sender of the data flow determined to be malicious.

Figure 5:
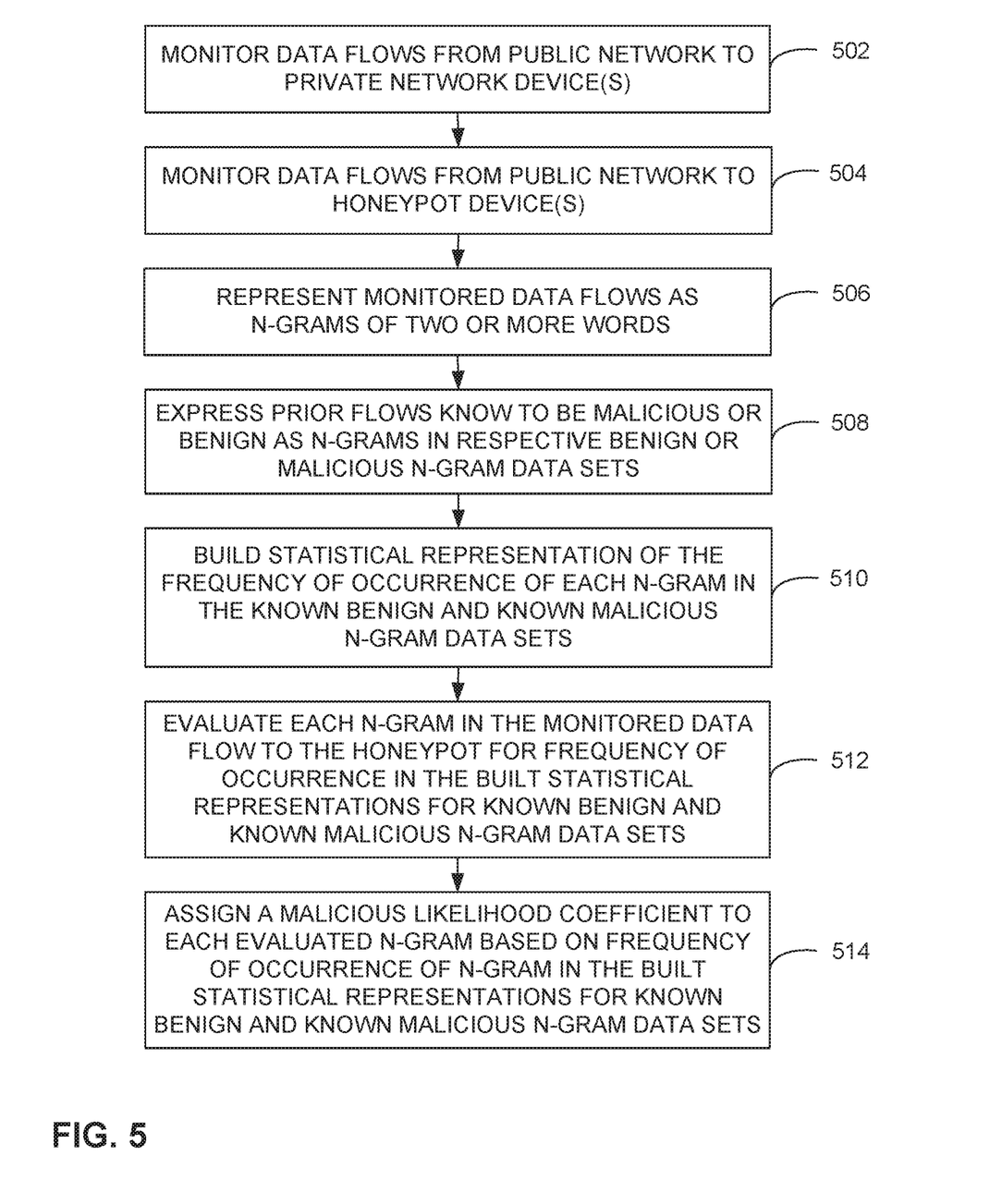
FIG. 5 is a flowchart of a method of characterizing network flows in a network with a honeypot with a probability of being malicious, consistent with an example embodiment.

FIG. 5 is a flowchart of a method of characterizing network flows in a network with a honeypot with a probability of being malicious, consistent with an example embodiment. At 502, data flows from a public network (e.g., public network 122) to one or more legitimate devices on a private network (e.g., computer 126, smartphone 128, smart thermostat 130, actual video camera 134) are monitored. Similarly, data flows from the public network to one or more honeypot devices (e.g., honeypot video camera 132) are monitored at 504. Both monitored data flows are represented as n-grams of data words, such as bi-grams or tri-grams, at 506.

Prior data flows known to be malicious are expressed in a ranked malicious n-gram data set (e.g., known malware data set 308) at 508, and prior data flows known to be benign are similarly expressed in a ranked-order benign n-gram data set (e.g., known benign data set 310) at 508. A statistical representation of the frequency of occurrence of each n-gram in the known benign and known malicious n-gram data sets is used to rank or order the n-grams representing the monitored data flows in each respective data set at 510.

At 512, each n-gram from the monitored data flow is evaluated for frequency of occurrence or percentile rank in the known benign data set and known malicious data set, and a malicious likelihood coefficient is calculated at 514 based on the frequency of occurrence or percentile rank of the n-gram in the known benign data set and the known malicious data set. In a further example, these n-grams characteristic of known malicious and known benign data flows are used to generate a classification model (such as using known machine learning or other methods) operable to monitor future data flows and to perform one or more actions (e.g., by network device 102, firewall 118, etc.) on the data flows characterized as being malicious to protect computer systems (e.g., computer 126, smartphone 128, etc. on a private network) from malicious data flows.

Figure 6:
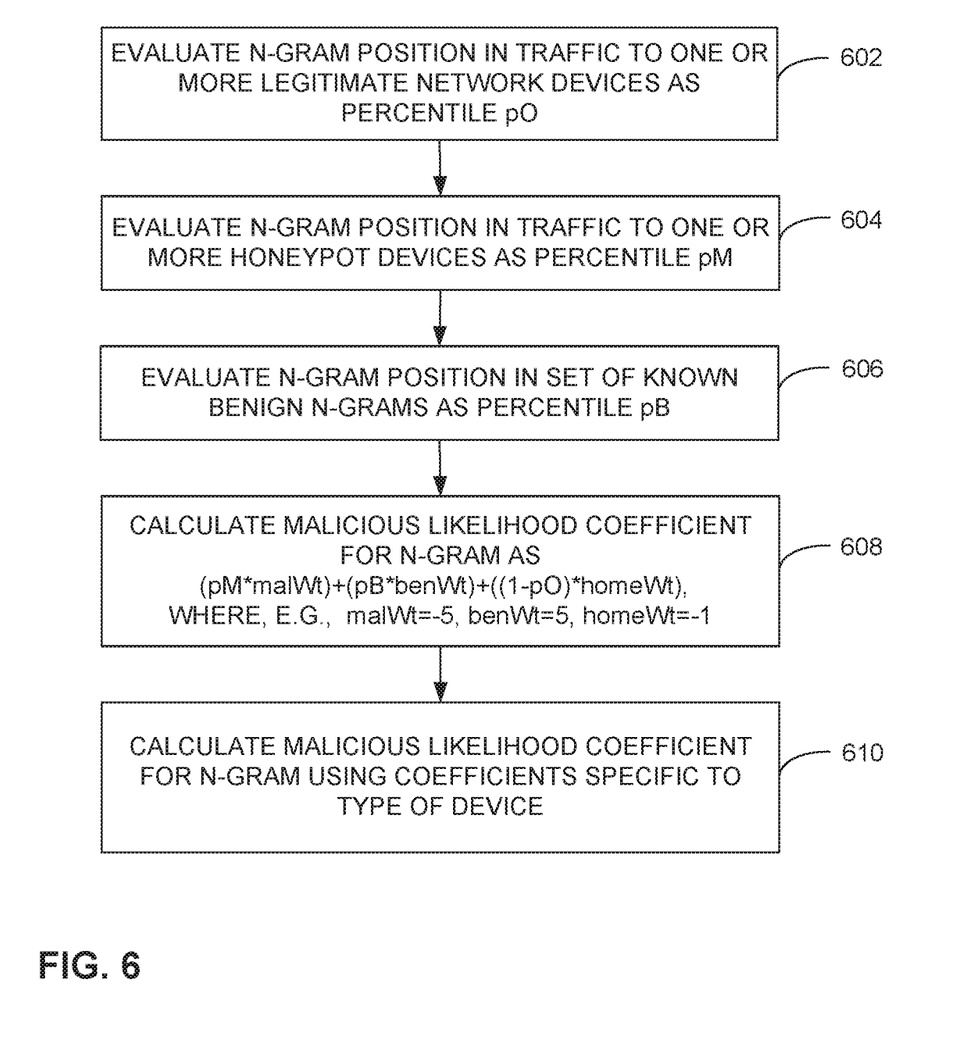
FIG. 6 is a flowchart of a method of calculating a probability of a network flow being malicious, consistent with an example embodiment.

FIG. 6 is a flowchart of a method of calculating a probability of a network flow being malicious, consistent with an example embodiment. At 602, the relative frequency of an n-gram from a monitored data flow is evaluated based on its position or rank within a set of n-grams representing observed traffic to one or more legitimate network devices as pO. Similarly, the n-gram's relative frequency in a set of n-grams representing observed traffic to one or more honeypot devices is evaluated as pM at 604. In an alternate embodiment, pM is evaluated based on the n-gram's relative frequency in a set of known malicious n-grams that is not purely derived from observed traffic to a honeypot. The n-gram's relative position in a set of known benign n-grams is evaluated as pB at 606, and the coefficients pO, pM, and pB are used to calculate a malicious likelihood coefficient for the n-gram at 608. In an embodiment, the malicious likelihood coefficient for the n-gram is calculated at 608 as pM*malWt+pB*benWt+(1−pO)*homeWt, where malWt is a negative number (e.g., −5, etc.), benWt is a positive number (e.g., +5, etc.), and homeWt is a negative number (e.g., −1, etc.).

The coefficients selected to scale each coefficient pO, pM, and pB (i.e., homeWt, malWt, and benWt, respectively) are selected at 608 as examples only, and may have different values in different applications or if optimized using particular sets of real-world data. In another example, the coefficients are calculated for the n-gram using data sets specific to the type of device with which the n-gram is communicating, such as is shown at 610. In an alternate embodiment, such a device-specific malicious likelihood coefficient is calculated in addition to the general traffic coefficient calculated at 608.

When automated classification of a set of n-grams has been completed, the known malicious and known benign n-gram sets can be used to generate a classification model for a firewall or other device to evaluate a data flow for n-grams that may be malicious. When an n-gram that may be malicious is detected, the n-gram in a further example is blocked, delayed, or triggers user notification to protect computer systems on the private network (e.g., computer 126, smartphone 128, etc. on a private network) from the malicious data flows.

In some example embodiments, the systems, methods, and techniques described herein are operable to identify and automatically characterize (e.g., label, classify, etc.) data flows in a pre-processing step for training malware identification tools, such as by identifying n-grams in the data flows that are characteristic of malicious and/or benign data flows. In a further example, characterized data flows are used to build a classification model such as using one or more machine learning methods (e.g., via training algorithms, etc.) that, when trained and executed by a computing device (e.g., network device 102, etc.), monitor future network data flows and predict or determine whether the monitored data flows are malicious. When the machine learning models predict or determine that the monitored data flows are malicious, one or more actions (e.g., terminating the connection, stopping or delaying the data flow, etc.) are performed by the computing device (e.g., network device 102, firewall 118, etc.) on the data flows to protect computer systems in the private network against the malicious data flows.

Figure 7:
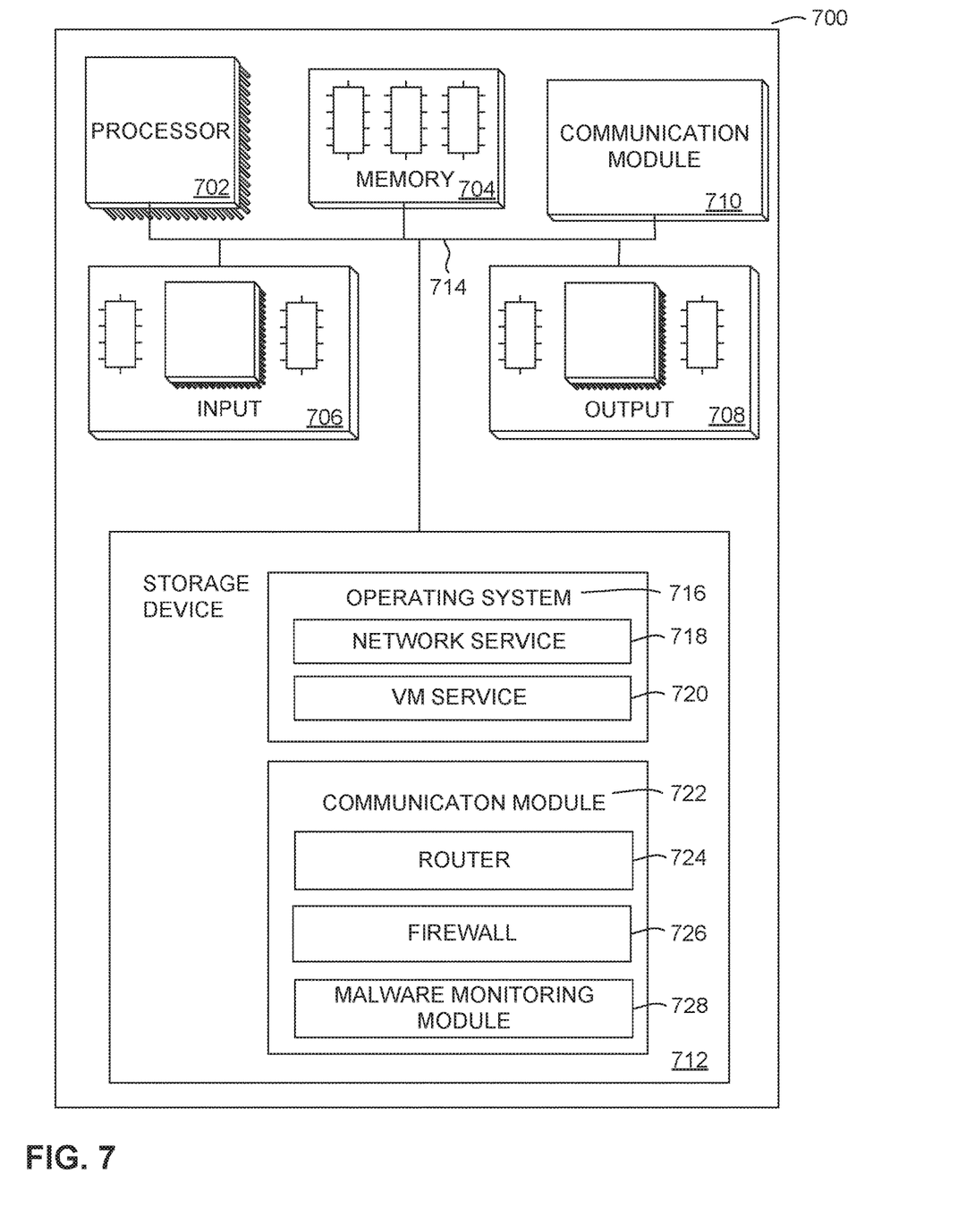
FIG. 7 is a computerized malware characterization system, consistent with an example embodiment of the invention.

FIG. 7 is a computerized malware characterization system, consistent with an example embodiment of the invention. FIG. 7 illustrates only one particular example of computing device 700, and other computing devices 700 may be used in other embodiments. Although computing device 700 is shown as a standalone computing device, computing device 700 may be any component or system that includes one or more processors or another suitable computing environment for executing software instructions in other examples, and need not include all of the elements shown here.

As shown in the specific example of FIG. 7, computing device 700 includes one or more processors 702, memory 704, one or more input devices 706, one or more output devices 708, one or more communication modules 710, and one or more storage devices 712. Computing device 700 in one example further includes an operating system 716 executable by computing device 700. The operating system includes in various examples services such as a network service 718 and a virtual machine service 720 such as a virtual server or virtualized honeypot device. One or more applications, such as communication module 722 are also stored on storage device 712, and are executable by computing device 700.

Each of components 702, 704, 706, 708, 710, and 712 may be interconnected (physically, communicatively, and/or operatively) for inter-component communications, such as via one or more communications channels 714. In some examples, communication channels 714 include a system bus, network connection, inter-processor communication network, or any other channel for communicating data. Applications such as communication module 722 and operating system 716 may also communicate information with one another as well as with other components in computing device 700.

Processors 702, in one example, are configured to implement functionality and/or process instructions for execution within computing device 700. For example, processors 702 may be capable of processing instructions stored in storage device 712 or memory 704. Examples of processors 702 include any one or more of a microprocessor, a controller, a digital signal processor (DSP), an application specific integrated circuit (ASIC), a field-programmable gate array (FPGA), or similar discrete or integrated logic circuitry.

One or more storage devices 712 may be configured to store information within computing device 700 during operation. Storage device 712, in some examples, is known as a computer-readable storage medium. In some examples, storage device 712 comprises temporary memory, meaning that a primary purpose of storage device 712 is not long-term storage. Storage device 712 in some examples is a volatile memory, meaning that storage device 712 does not maintain stored contents when computing device 700 is turned off. In other examples, data is loaded from storage device 712 into memory 704 during operation. Examples of volatile memories include random access memories (RAM), dynamic random access memories (DRAM), static random access memories (SRAM), and other forms of volatile memories known in the art. In some examples, storage device 712 is used to store program instructions for execution by processors 702. Storage device 712 and memory 704, in various examples, are used by software or applications running on computing device 700 such as communication module 722 to temporarily store information during program execution.

Storage device 712, in some examples, includes one or more computer-readable storage media that may be configured to store larger amounts of information than volatile memory. Storage device 712 may further be configured for long-term storage of information. In some examples, storage devices 712 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 700, in some examples, also includes one or more communication modules 710. Computing device 700 in one example uses communication module 710 to communicate with external devices via one or more networks, such as one or more wireless networks. Communication module 710 may be a network interface card, such as an Ethernet card, an optical transceiver, a radio frequency transceiver, or any other type of device that can send and/or receive information. Other examples of such network interfaces include Bluetooth, 4G, LTE, or 5G, Wi-Fi radios, and Near-Field Communications (NFC), and Universal Serial Bus (USB). In some examples, computing device 700 uses communication module 710 to wirelessly communicate with an external device such as via public network 122 of FIG. 1.

Computing device 700 also includes in one example one or more input devices 706. Input device 706, in some examples, is configured to receive input from a user through tactile, audio, or video input. Examples of input device 706 include a touchscreen display, a mouse, a keyboard, a voice-responsive system, a video camera, a microphone, or any other type of device for detecting input from a user.

One or more output devices 708 may also be included in computing device 700. Output device 708, in some examples, is configured to provide output to a user using tactile, audio, or video stimuli. Output device 708, in one example, includes a display, a sound card, a video graphics adapter card, or any other type of device for converting a signal into an appropriate form understandable to humans or machines. Additional examples of output device 708 include a speaker, a light-emitting diode (LED) display, a liquid crystal display (LCD), or any other type of device that can generate output to a user.

Computing device 700 may include operating system 716. Operating system 716, in some examples, controls the operation of components of computing device 700, and provides an interface from various applications such as communication module 722 to components of computing device 700. For example, operating system 716, in one example, facilitates the communication of various applications such as communication module 722 with processors 702, communication unit 710, storage device 712, input device 706, and output device 708. Applications such as communication module 722 may include program instructions and/or data that are executable by computing device 700. As one example, communication module 722 provides network routing functions using router module 724, provides firewall functionality to block unwanted connections and data using firewall module 726, and performs the malware monitoring and characterization functions described herein using malware monitoring module 728. These and other program instructions or modules may include instructions that cause computing device 700 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of identifying malicious activity in a sequence of computer network data, comprising:
    monitoring data flows from a public network to one or more networked devices on a private network;
    representing each of the data flows as a word, and representing a sequence of the data flows as an n-gram of two or more words;
    evaluating each n-gram for statistical position within each of a first and second data set ordered by frequency of n-gram occurrence within a data type represented by the respective data set;
    characterizing each n-gram with a probability of being of a data type represented by either the first or second data set based on its statistical position within at least one of the first and second data sets, wherein characterizing each n-gram comprises:
    building a statistical representation of the frequency of occurrence of each n-gram in the monitored data flows from the public network;
    evaluating each n-gram in the monitored data flows by evaluating the frequency of occurrence of each such n-gram in the built statistical representation, in prior flows known to be malicious, and in prior flows known to not be malicious; and
    assigning a malicious likelihood coefficient to each n-gram in the monitored data flows based on the frequency of occurrence of each such n-gram in the built statistical representation multiplied by a negative coefficient, in the prior flows known to be malicious multiplied by a negative coefficient, and in the prior flows known to not be malicious multiplied by a positive coefficient; and generating a classification model using the characterized n-grams, such that the classification model is operable to classify at least one of the data flows as benign or malicious.

2. The method of identifying malicious activity in a sequence of computer network data of claim 1, the classification model further operable to cause at least one action to be taken in response to classifying at least one of the data flows as malicious, the at least one action comprising at least one of blocking at least one of the data flows, delaying at least one of the data flows, and notifying a user of a malicious data flow.

3. The method of identifying malicious activity in a sequence of computer network data of claim 1, wherein the statistical position within each of a first and second data set is percentile rank of occurrence within the respective data set.

4. The method of identifying malicious activity in a sequence of computer network data of claim 1, wherein characterizing each n-gram comprises characterizing each n-gram based on its presence or statistical position within both the first and second data sets.

5. The method of identifying malicious activity in a sequence of computer network data of claim 1, further comprising evaluating each n-gram for position within at least a third data set representing a third data type.

6. The method of identifying malicious activity in a sequence of computer network data of claim 5, further comprising characterizing each n-gram with a probability of being a member of the third data set based on its statistical position within at least one of the first, second, and third data sets.

7. A method of identifying malicious activity in a sequence of computer network data, comprising:
monitoring data flows from a public network to one or more networked devices on a private network;
monitoring data flows from a public network to one or more honeypots that appear to the public network to be private network devices;
representing each of the data flows from to one or more networked devices on a private network and each of the data flows to one or more honeypots as a word, and representing a sequence of any of the data flows as an n-gram of two or more words;
characterizing the data flows more strongly associated with the one or more honeypots relative to the one or more networked devices as more likely malicious, wherein characterizing the data flows comprises:
expressing prior flows known to be malicious or not malicious as n-grams; expressing the monitored data flows from the public network as n-grams;
building a statistical representation of the frequency of occurrence of each n-gram in the monitored data flows from the public network;
evaluating each n-gram in the monitored data flows from the public network to the honeypot by evaluating the frequency of occurrence of each such n-gram in the built statistical representation, in the prior flows known to be malicious, and in the prior flows known to not be malicious; and
assigning a malicious likelihood coefficient to each n-gram in the monitored data flows based on the frequency of occurrence of each such n-gram in the built statistical representation multiplied by a negative coefficient, in the prior flows known to be malicious multiplied by a negative coefficient, and in the prior flows known to not be malicious multiplied by a positive coefficient; and performing at least one action on data flows characterized as being malicious to prevent the malicious data flows from reaching the one or more networked devices on the private network.

8. The method of identifying malicious activity in a sequence of computer network data of claim 7, further comprising performing at least one of the monitoring data flows to one or more networked devices, monitoring data flows to one or more honeypots, and characterizing the data flows in a firewall device.

9. The method of identifying malicious activity in a sequence of computer network data of claim 1, further comprising creating one or more honeypots in a networked device.

10. The method of identifying malicious activity in a sequence of computer network data of claim 9, wherein the networked device comprises one of a firewall or a networked device separated from the public network by a firewall.

11. The method of identifying malicious activity in a sequence of computer network data of claim 7, wherein the honeypot is configured to at least one of appear like and respond like a specific networked device to devices on the public network.

12. The method of identifying malicious activity in a sequence of computer network data of claim 7, wherein the two or more words representing each data flow comprise an n-gram of sequential words, where n is two or greater.

13. The method of identifying malicious activity in a sequence of computer network data of claim 7, wherein the frequency of occurrence comprises a position in each set of monitored and prior data flows ranked by frequency of occurrence.

14. The method of identifying malicious activity in a sequence of computer network data of claim 7, further comprising adding data flows having a malicious likelihood coefficient exceeding a threshold to the set of prior flows known to be malicious.

15. A network device configured to identify malicious activity in a sequence of computer network data, comprising:
a first network interface operable to exchange network data with devices on a public network;
a second network interface operable to exchange network data with devices on a private network;
a communication module operable to exchange network data between the public network and the private network; and
a malware monitoring module operable to monitor data flows from the public network to one or more networked devices on the private network and one or more honeypots that appear to the public network to be devices on the private network, each of the data flows comprising two or more words, and further operable to characterize the data flows more strongly associated with the one or more honeypots relative to the one or more networked devices as more likely malicious, and further operable to express prior flows known to be malicious or not malicious as n-grams;
express the monitored data flows from the public network as n-grams;

build a statistical representation of the frequency of occurrence of each n-gram in the monitored data flows from the public network for each of a plurality of types of network device;

evaluate each n-gram in the monitored data flows from the public network to the honeypot by evaluating the frequency of occurrence of each such n-gram for each of the plurality of types of networked device in the built statistical representation, in the prior flows known to be malicious, and in the prior flows known to not be malicious; and assign a malicious likelihood coefficient to each n-gram in the monitored data flows for each of the plurality of devices based on the frequency of occurrence of each such n-gram in the built statistical representation multiplied by a negative coefficient, in the prior flows known to be malicious multiplied by a negative coefficient, and in the prior flows known to not be malicious multiplied by a positive coefficient, wherein the communication module is further operable to perform at least one action on data flows characterized as malicious to prevent the malicious data flows from reaching the devices on the private network.

* * * * *